United States Patent [19]

Takeuchi et al.

[11] Patent Number: 4,724,372
[45] Date of Patent: Feb. 9, 1988

[54] SPEED CONTROL APPARATUS OF HYDRAULIC ACTUATOR

[75] Inventors: Kunihiko Takeuchi, Kawasaki; Masao Ōba, Yokohama; Kiyoshi Hayashi, Tokyo, all of Japan

[73] Assignee: Tokyo Keiki Company Ltd., Tokyo, Japan

[21] Appl. No.: 909,110

[22] Filed: Sep. 18, 1986

[30] Foreign Application Priority Data

Sep. 19, 1985 [JP] Japan .................. 60-207289

[51] Int. Cl.$^4$ .................................. G05B 19/40
[52] U.S. Cl. ............................ 318/685; 318/696
[58] Field of Search .............. 318/685, 696; 236/78 C

[56] References Cited

U.S. PATENT DOCUMENTS 3,913,833 10/1975 Mimett et al. ............... 236/78 C X
4,574,686 3/1986 Budzich ......................... 318/685 X

OTHER PUBLICATIONS

"Digital Valve Control System", Tokyo Keiki Company Ltd., pp. 50-54.

TD62803P "Stepping Motor Controller/Driver", Toshiba, pp. 245-250.
PMM8713 "Stepping Motor Driver", Sanyo Electric Company Ltd., pp. 8-12.

Primary Examiner—William M. Shoop, Jr.
Assistant Examiner—Saul M. Bergmann
Attorney, Agent, or Firm—Wenderoth, Lind & Ponack

[57] ABSTRACT

The driving speed of a hydraulic actuator is feedback controlled by adjusting an amount of fluid by a digital valve having a valve which is opened and closed by a pulse motor. For speed control, the deviation between a set speed of the actuator which is set by a speed setting device and a detection speed of the actuator which is detected by a speed sensor is obtained. A pulse signal of a frequency proportional to the magnitude of the deviation is generated. When the deviation is positive, the pulse motor is driven using the pulse signal as a CW command pulse. When the deviation is negative, the pulse motor is driven using the pulse signal as a CCW command pulse. The rotational amount of the pulse motor is the integral of the pulse frequency which is proportional to the deviation.

5 Claims, 8 Drawing Figures

SPEED CONTROL APPARATUS OF HYDRAULIC ACTUATOR

BACKGROUND OF THE INVENTION

The present invention relates to a speed control apparatus for controlling a driving speed of a hydraulic actuator due to the adjustment of the fluid by a digital valve and, more particularly, to a speed control apparatus of a hydraulic actuator for controlling the driving speed of the actuator so as to become equal to the set speed in a feedback manner.

Hitherto, as a speed control apparatus for controlling the driving speed of the hydraulic actuator due to the adjustment of the flow rate in an analogwise manner, the apparatus as shown in, for example, FIG. 1 is known.

In FIG. 1, a speed setting device 10 consists of a potentiometer and the like and sets the driving speed $V_s$ of an actuator 20 of a hydraulic cylinder and the like to be controlled. Numeral 12 denotes an adding point of the feedback control loop. The adding point 12 outputs the deviation $\Delta V = (V_s - V)$ between the set speed signal $V_s$ from the speed setting device 10 and the detection speed V from a speed sensor 22 using a tachogenerator and the like to detect the driving speed of the actuator 20.

A servo amplifier 14 outputs the signal $(K_p \cdot \Delta V)$ which is derived by multiplying the deviation signal $\Delta V$ from the adding point 12 by $K_p$ by a constant amplification factor, or the signal $(K_p \cdot \Delta V + K_i \int \Delta V dt)$ as the result of the addition of that signal and the signal which is obtained by time-integrating the deviation signal $\Delta V$ and further multiplying the result by a predetermined integration constant $K_i$.

A servo valve 16 converts the electrical signal to a hydraulic pressure and receives the hydraulic pressure from a fluid pressure source 18 such as a hydraulic pump and the like. The servo valve 16 makes the internal torque motor operative in accordance with the driving signal from the servo amplifier 14; converts the electrical signal to the pilot hydraulic pressure by use of the combination mechanism of a nozzle and a flapper; moves a spool by the pilot hydraulic pressure; and adjusts the operating hydraulic pressure to be supplied to the actuator 20 from the fluid pressure source 18.

According to the above feedback control system, the deviation signal $\Delta V$ between the set speed signal $V_s$ from the speed setting device 10 and the detection speed signal V to be fed back from the speed sensor 22 is obtained by the adding point 12; the deviation signal $\Delta V$ is amplified by the servo amplifier 14 in an analogwise manner; supplies the amplified signal to the torque motor of the servo valve 16; and controls the driving speed of the actuator 20 in a feedback manner such that the deviation $\Delta V$ between the set speed $V_s$ and the detection speed V becomes zero by way of the proportional control based on the proportional constant $(K_p)$ set in the servo amplifier 14 or by way of the proportional integration control based on the proportional constant $(K_p)$ and the integration constant $(K_i)$.

FIG. 2 shows a conventional speed control apparatus using a digital control system.

In FIG. 2, a digital speed setting device 24 outputs the set speed V to drive the actuator 20 as digital data of, for instance, eight bits. A rotary encoder 30 outputs a pulse signal of a frequency which is proportional to the driving speed of the actuator 20. The pulse signal from the rotary encoder 30 is input to a speed sensor 32. The speed sensor 32 detects the driving speed V of the actuator 20 from, for example, the reciprocal (1/T) of the period T of the pulse signal and outputs it as the digital speed data V of eight bits.

An operational unit 26 receives the set speed data $V_s$ from the digital speed setting device 24 and the detection speed data V from the speed sensor 32, and obtains the deviation $\Delta V = V_s - V$ by a digital arithmetic operation, and further executes the digital arithmetic operation of $(K_p \cdot \Delta V + K_i \int \Delta V dt)$ for, e.g., the proportional integration control. A digital-to-analog (D/A) converter 28 converts the control data which is output from the operational unit 26 to an analog signal, amplifies it by the servo amplifier 14, and outputs the analog control signal to the servo valve 16.

However, in such a speed control apparatus of the hydraulic actuator using the conventional servo valve, the maintenance and management of the operations of the flapper and spool and the like in the servo valve are complicated since sticking and the like are caused by even small particles of dust. Also, the apparatus of the servo valve is large in size and expensive. Furthermore, if it is intended to perform the digital control which can be easily controlled and has a high degree of accuracy, there are the disadvantages such that the D/A converter and the like must be provided and the whole system becomes expensive and is enlarged and the like.

SUMMARY OF THE INVENTION

It is an object of the present invention to provide a speed control apparatus of a hydraulic actuator in which an electrical signal is converted into an amount of fluid by a digital valve using a pulse motor as a driving source, and thereby controlling the speed of the hydraulic actuator.

Another object of the invention is to provide a speed control apparatus of a hydraulic actuator in which the driving pulse of the frequency corresponding to the deviation between the set speed and the detection speed is supplied to a pulse motor of a digital valve, and thereby controlling the speed of the actuator so as to become the set speed in a feedback manner.

Still another object of the invention is to provide a speed control apparatus of a hydraulic actuator in which a pulse motor of a digital valve is driven by the feedback control due to an analog arithmetic operation.

Still another object of the invention is to provide a speed control apparatus of a hydraulic actuator in which a pulse motor of a digital valve is driven by the feedback control due to a digital arithmetic operating process.

The above and other objects, features, and advantages of the invention will be more apparent from the following detailed description in conjunction with the accompanying drawings.

DETAILED DESCRIPTION OF THE EMBODIMENTS

Figure 1:
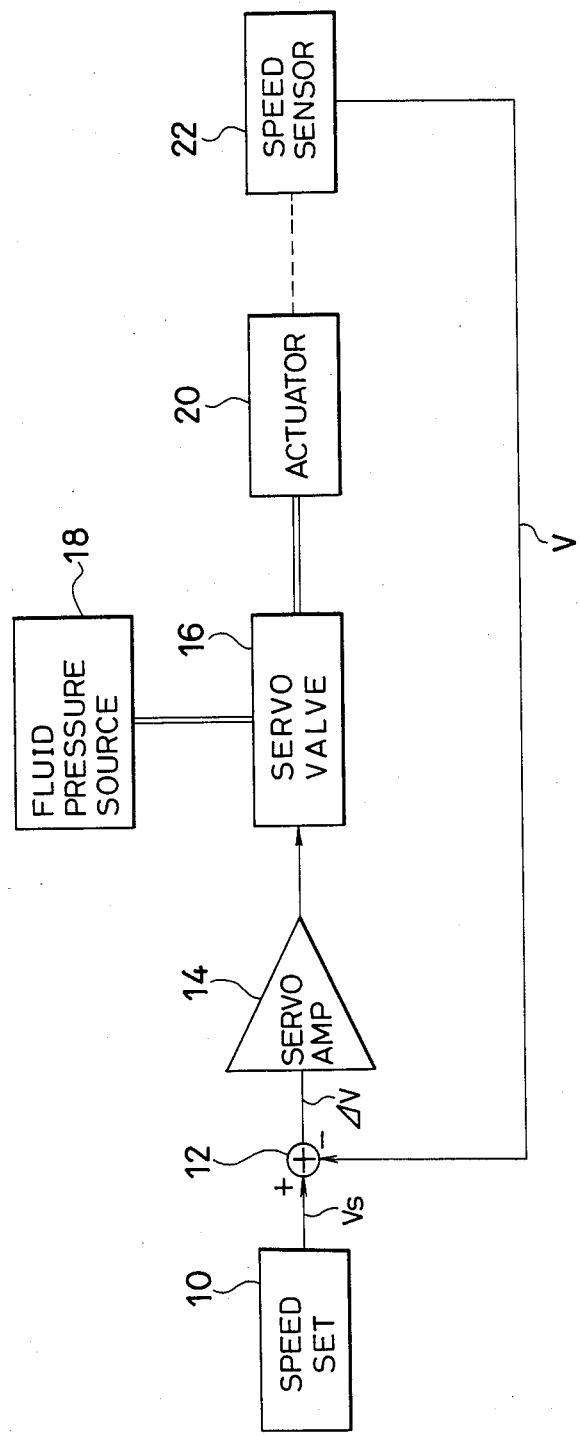
FIG. 1 is a block diagram showing a conventional analog speed control apparatus.
Figure 2:
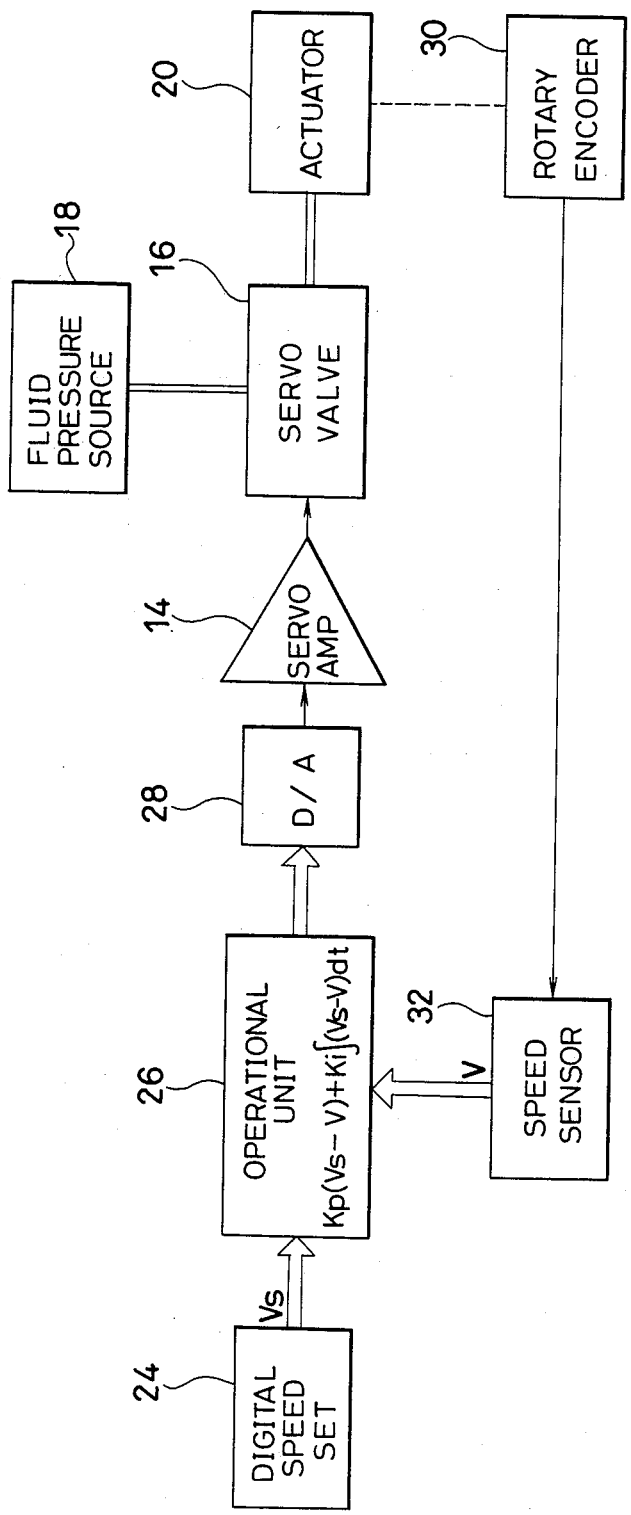
FIG. 2 is a block diagram showing a conventional digital speed control apparatus.
Figure 3:
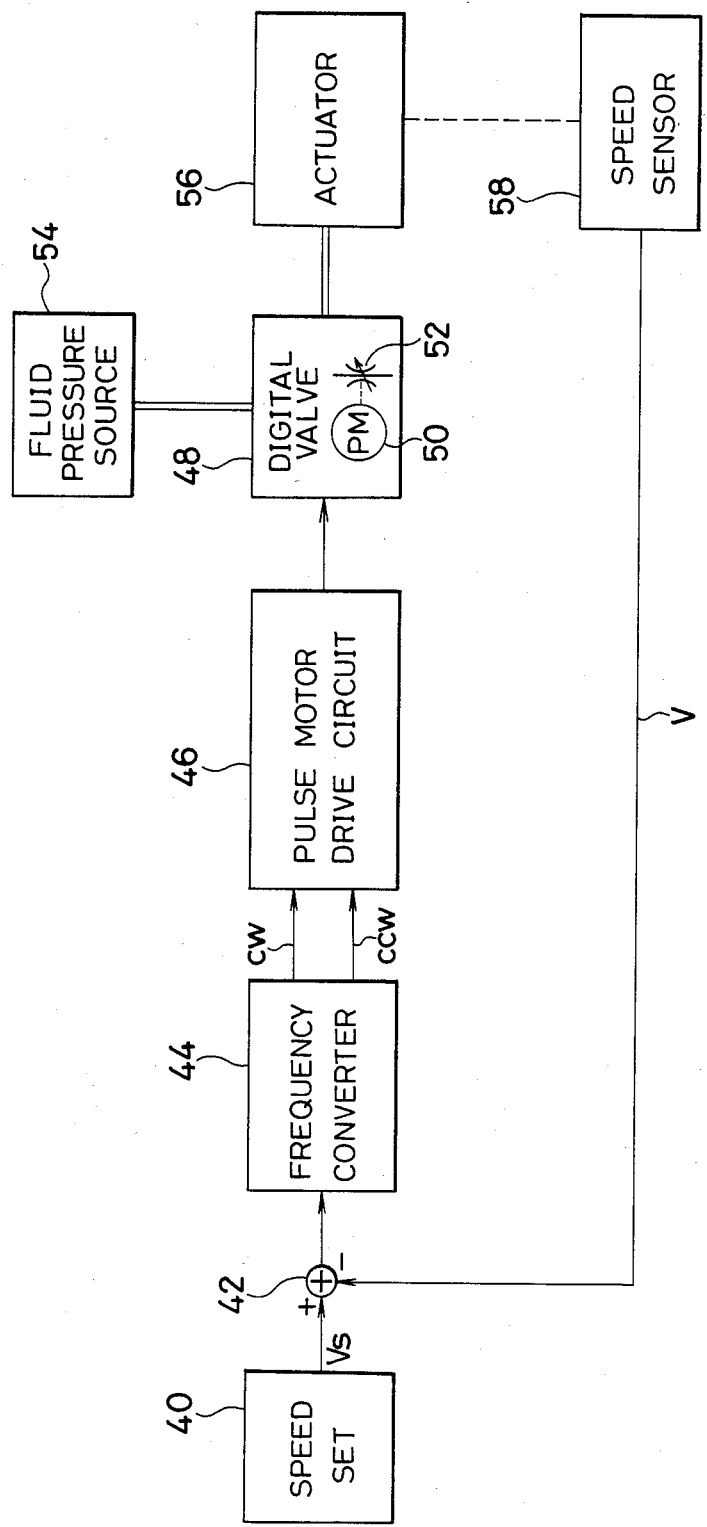
FIG. 3 is a block diagram showing an embodiment of the present invention using an analog arithmetic operation.

FIG. 3 is a block diagram showing an embodiment of a speed control apparatus of the present invention using an analog arithmetic operation.

An arrangement of this apparatus will now be described hereinbelow. A speed setting device 40 sets the set speed $V_s$ to be controlled by way of an analog voltage. A potentiometer, for example, may be used as the speed setting device 40. An adding point 42 of the feedback loop outputs the deviation signal $\Delta V = (V_s - V)$ between the set speed signal $V_s$ from the speed setting device 40 and the driving speed detection signal V of an actuator 56 which was detected by a speed sensor 58.

A tachogenerator may be used as the speed sensor 58. An operational unit to generate a differential output may be used as the adding point 42.

A frequency converter 44 determines whether the value of the deviation signal $\Delta V$ from the adding point 42 is positive or negative and generates a frequency signal of frequency (f) corresponding to the absolute value $|\Delta V|$ of the deviation signal.

Namely, there is the relationship of $$f = K \cdot |\Delta V| \quad (1)$$

(where, K is a constant) between the absolute value $|\Delta V|$ of the deviation signal and the frequency (f). It will be understood from this expression that the frequency (f) increases as the absolute value $|\Delta V|$ of the deviation signal increases.

Furthermore, the frequency converter 44 outputs the frequency signal as a CW command pulse if the value of the deviation signal $\Delta V$ is positive and outputs the frequency signal as a CCW command pulse if the value of $\Delta V$ is negative.

Namely, if the deviation signal is $+|\Delta V|$, the frequency converter 44 generates CW command pulses as many as $\phi$ per unit time corresponding to the frequency which is determined by expression (1). If the deviation signal is $-|\Delta V|$, the converter 44 generates the CCW pulses as many as $\phi$ per unit time corresponding to the frequency which is determined by expression (1).

The frequency converter 44 may be constituted by a voltage controlled oscillator which can control the oscillating frequency by the deviation voltage signal $\Delta V$ and a multiplexer to switch the output of the CW pulses and the output of the CCW pulses in accordance with the positive or negative value of the deviation signal.

The highest frequency of the CW pulses or CCW pulses which are generated from the frequency converter 44 is set to be equal to or lower than the maximum response speed of a pulse motor 50 provided in a digital valve 48, which will be explained later.

When a pulse motor drive circuit 46 receives the CW pulses from the converter 44, the drive circuit 46 rotates the pulse motor 50 provided for the digital valve 48 step by step in the CW direction in response to the CW pulses. A variable throttle 52 is opened due to the rotation of the pulse motor 50 in the CW direction. When the drive circuit 46 receives the CCW pulses, it rotates the pulse motor 50 step by step in the CCW direction in response to the CCW pulses, so that the variable throttle 52 is driven so as to be closed.

Therefore, the digital valve 48 functions to control the operating fluid to be supplied to the actuator 56 consisting of a hydraulic cylinder and the like from a fluid pressure source 54 in accordance with the opening degree of the variable throttle 52, thereby controlling the driving speed of the actuator 56.

The following relationship is satisfied between the frequency of the input signal to the pulse motor drive circuit 46 and the rotational amount X of the pulse motor 50.

$$X = \int_{t_1}^{t_2} f\,dt \quad (2)$$

(where, it is assumed that the CW input pulses have the positive values and the CCW input pulses have the negative values).

Namely, the value which is obtained by integrating the input pulses for a predetermined period of time $T = t_2 - t_1$ becomes the rotational amount X of the pulse motor 50.

As shown in expression (1), the frequency (f) of the CW or CCW pulses which are generated from the frequency converter 44 corresponds to the deviation signal $\Delta V$, so that expression (2) can be rewritten as the following expression (3).

$$X = \int_{t_1}^{t_2} f\,dt = \int_{t_1}^{t_2} K_i \cdot \Delta V\,dt$$

Therefore, $$X = K_i \cdot \int_{t_1}^{t_2} \Delta V\,dt \quad (3)$$

Consequently, by driving the pulse motor 50 by the CW or CCW pulses of the frequency corresponding to the deviation signal $\Delta V$, the same effect as the feedback control based on the deviation signal can be obtained.

As the digital valve 48 adapted to be used in the embodiment shown in FIG. 3, the digital valve of "D-DF (R) G series" manufactured and sold by TOKYO KEIKI Co., Ltd. (in Japan) or VICKERS (in U.S.A.) can be used. The maximum speed of the pulse motor using this digital valve is 1000 pps.

The operation of the embodiment in FIG. 3 will now be described.

It is now assumed that an arbitrary set speed $V_s$ was set by the speed setting device 40. The deviation $\Delta V$ between the set speed signal $V_s$ and the detection speed signal V fed back from the speed sensor 58 is detected by the adding point 42. When the deviation signal $\Delta V$ has a positive value, the CW pulses of the frequency proportional to the absolute value $|\Delta V|$ are generated from the frequency converter 44. On the contrary, when the deviation signal $\Delta V$ has a negative value, the CCW pulses of the frequency proportional to the absolute value $|\Delta V|$ are output from the converter 44. The CW or CCW pulses from the converter 44 are supplied to the pulse motor drive circuit 46 and the pulse motor 50 is driven in response to the CW or CCW pulses. Thus, the variable throttle 52 of the digital valve 48 is opened or closed.

As shown in expressions (1) to (3), the opening/closing amount of the variable throttle 52 which is determined by the rotational amount X of the pulse motor 50 in the digital valve 48 becomes the integration value of the frequency proportional to the deviation signal $\Delta V$, namely, the integration value of the CW or CCW pulses. Consequently, a speed control similar to the conventional integration control is performed. The speed of the actuator 56 can be controlled so as to become the speed corresponding to the set speed signal $V_s$.

As described above, according to the embodiment in FIG. 3, the actuator is driven by the frequency signal of the frequency converter 44 in which the digital valve suitable for the digital control is provided in the analog feedback loop. Therefore, even if the set speed signal $V_s$, detection speed signal V, and deviation signal $\Delta V$ are all analog signals, the feedback control by the digital valve 48 can be executed without the necessity of execution of, in particular, an A/D conversion or D/A conversion. Thus, it is possible to realize the small-sized and cheap speed control apparatus using the digital valve without using any A/D converter, D/A converter, or the like.

Figure 4:
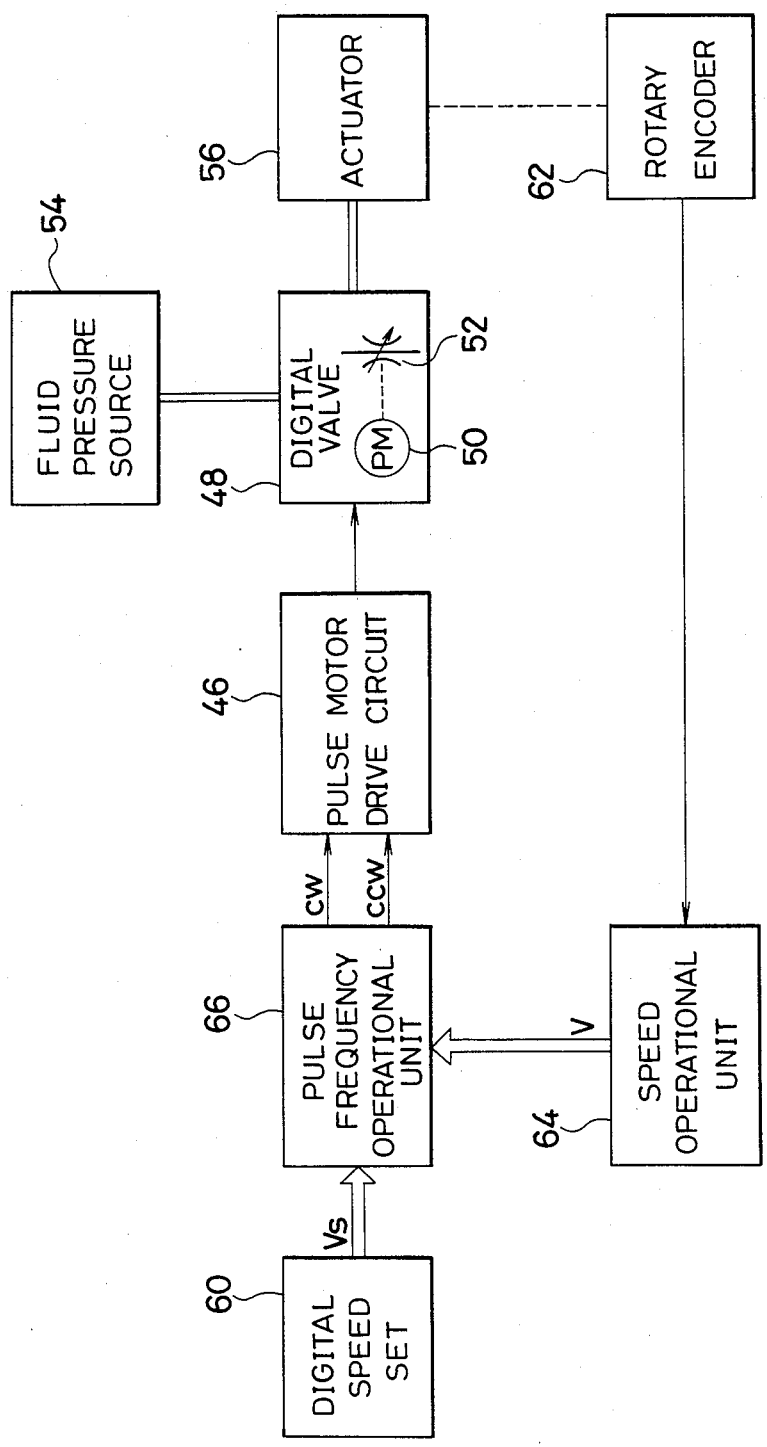
FIG. 4 is a block diagram showing another embodiment of the invention using an digital arithmetic operation.

FIG. 4 is a block diagram showing another embodiment of the invention by the digital arithmetic operation.

In FIG. 4, a digital speed setting device 60 outputs set speed data $V_s$ of, e.g., eight bits.

A rotary encoder 62 outputs a pulse signal of a frequency proportional to the driving speed of the actuator 56 and has the function of the digital speed sensor. A speed operational unit 64 detects the driving speed of the actuator 56 on the basis of the pulse signal from the rotary encoder 62 and outputs it as the detection speed data V of, e.g., eight bits.

A pulse frequency operational unit 66 receives the set speed data $V_s$ from the digital speed setting device 60 and the detection speed data V from the speed operational unit 64 and generates the CW or CCW pulses having a frequency (f) proportional to the absolute value $|\Delta V|$ of the deviation $\Delta V$ by the digital arithmetic operating process, which will be clearly described hereinafter. The CW pulses are generated when the deviation $\Delta V$ has a positive value. The CCW pulses are generated when the deviation $\Delta V$ has a negative value.

The pulse motor drive circuit 46, the digital valve 48 having the pulse motor 50 and variable throttle 52, the fluid pressure source 54, and the actuator 56 are the same as the embodiment in FIG. 3.

Figure 5:
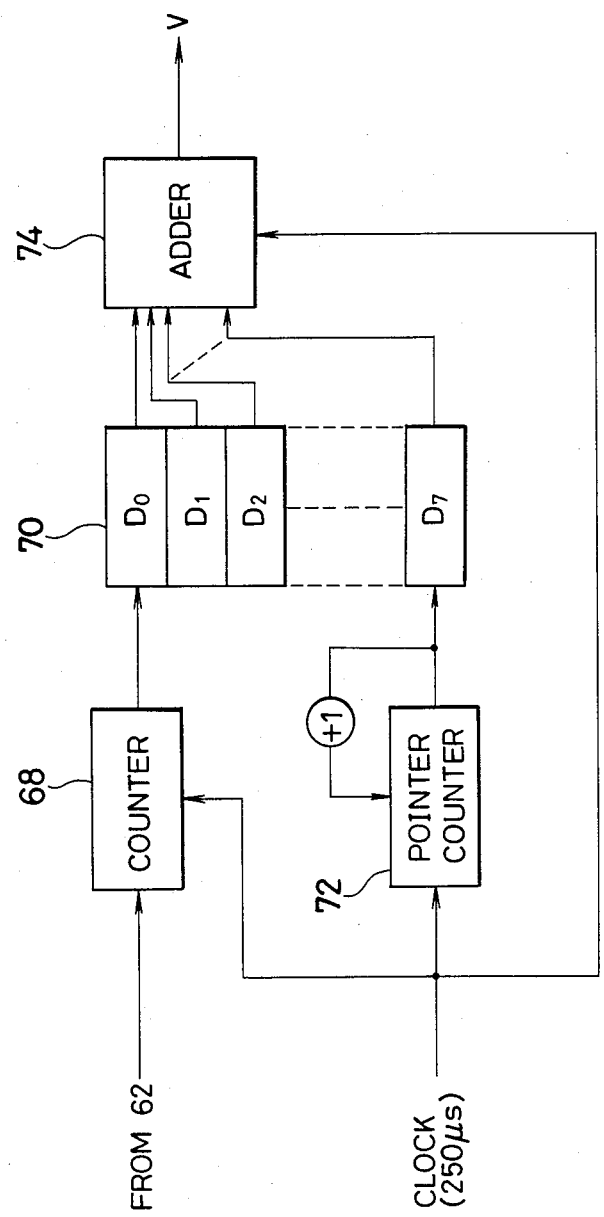
FIG. 5 is a block diagram showing an embodiment of a speed operational unit in FIG. 4.

FIG. 5 is a block diagram showing a practical example of the speed operational unit 64 in FIG. 4. The speed operational unit 64 obtains the speed by counting the number of pulses per unit time which are obtained from the rotary encoder 62.

In FIG. 5, a counter 68 counts the number of pulses output from the rotary encoder 62 for a constant period of time at every period of, e.g., 250 μsec. Numeral 70 denotes a memory such as an RAM or the like to store eight data values $D_0$ to $D_7$. The memory 70 sequentially stores the count values derived by the counter 68 at every period of 250 μsec as the data values $D_0$ to $D_7$. When the memory 70 stores the ninth data value after the first eight data values were completely stored, the ninth data value is stored by performing a first-in/first-out (FIFO) storing process such that the data value $D_0$ stored for the first time is erased and the ninth data value newly derived is then written.

Numeral 72 denotes a pointer counter to control the storage of the memory 70. The counter 72 receives the clock at every 250 μsec and increases the content of the pointer, thereby sequentially designating the addresses $A_0$ to $A_7$ in the memory 70 and writing the data values $D_0$ to $D_7$. After the eight clocks were counted and the data value $D_7$ was stored, the content of the pointer is cleared and the counting operation is again repeated from the address $A_0$.

An adder 74 adds the data values $D_0$ to $D_7$ stored in the memory 70 in response to the clocks at every 250 μsec. The output of the adder 74 becomes the detection speed data V.

Figure 6:
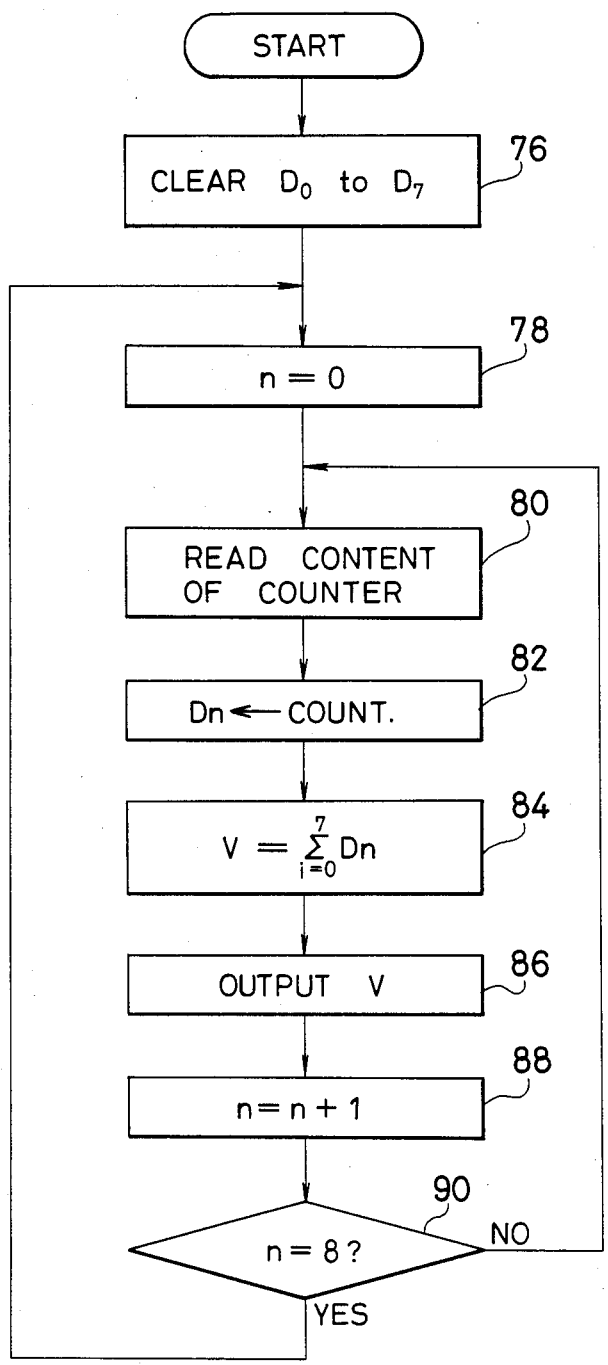
FIG. 6 is a flowchart showing the arithmetic operating processes of a speed operational unit in FIG. 5.

The processing operation of the embodiment in FIG. 5 will now be described with reference to a flowchart shown in FIG. 6.

This processing routine is executed each time the clock is received at every 250 μsec. First, the content of the memory 70 is cleared in block 76. the count value n of the pointer counter 72 is set to 0 in the next block 78.

Subsequently, the content of the counter 68 is read in block 80. The data value $D_n$ is written into the address $A_n$ in the memory 70 which is designated by $A_n = n$ in the next block 82. In block 84, the detection speed V is calculated from the sum of the data values $D_0$ to $D_7$ by the adder 74. The detection speed V is output in block 86.

Subsequently, the value of n is increased to $n+1$ in block 88. A check is made in discriminating block 90 to see if n equals 8. If NO in block 90, the processing routine is returned to block 80 and the same processes as mentioned above are repeated in response to the next clock.

On the contrary, if $n=8$, the processing routine is returned to block 78 and n is set to 0. Then, the data value $D_0$ which has already been stored is rewritten to the new data.

In the above speed detecting process, the sum of eight data values derived at every 250 μsec for the time interval from the current time until the time of eight periods of the clocks before is calculated as the detection speed.

Figure 7:
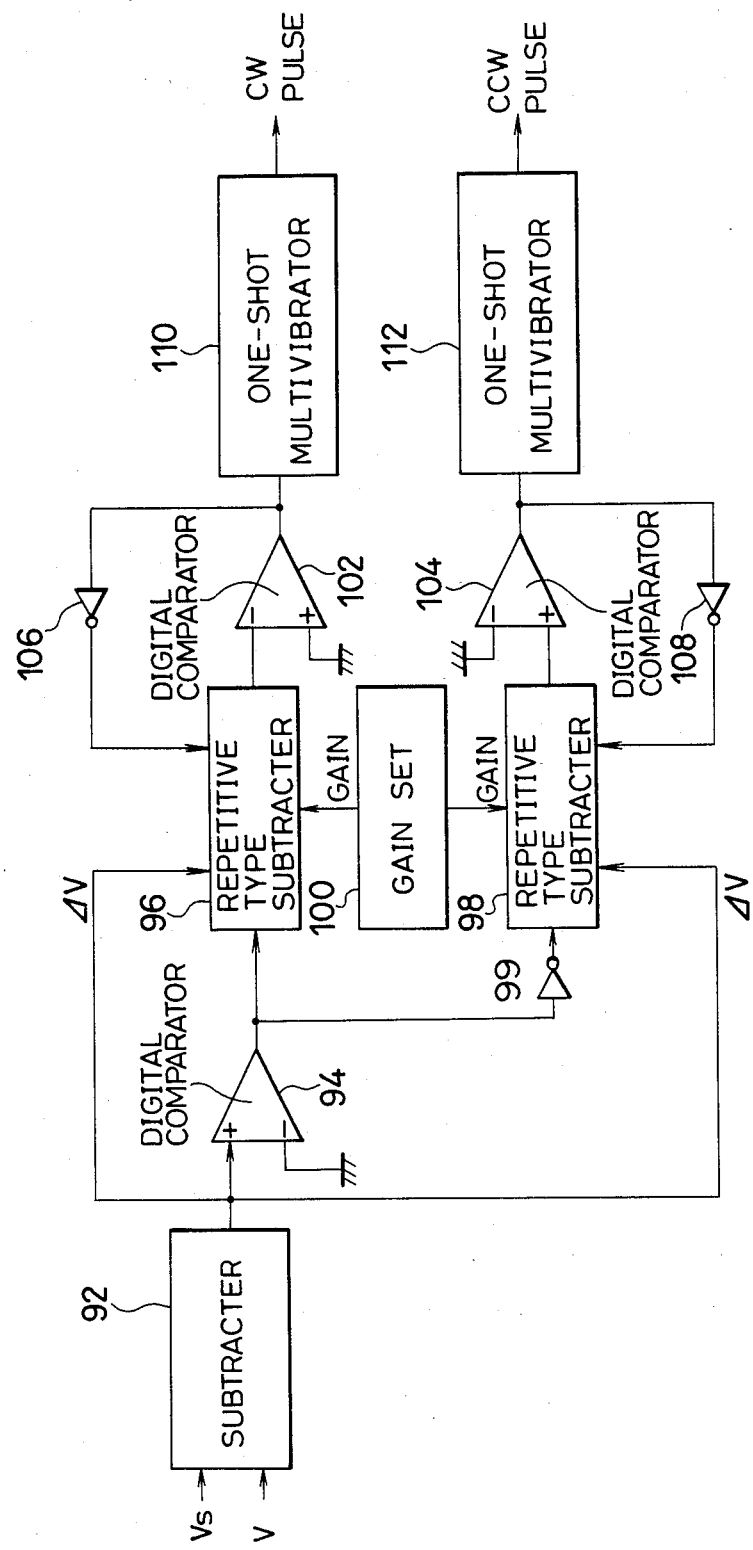
FIG. 7 is a block diagram showing an embodiment of a pulse frequency operational unit in FIG. 4.

FIG. 7 is a block diagram showing a practical example of the pulse frequency operational unit 66 in FIG. 4.

In FIG. 7, a subtracter 92 calculates the deviation $\Delta V$, as $\Delta V = V_s - V$, between the set speed data $V_s$ derived from the digital speed setting device 60 and the detection speed data V obtained from the speed operational unit 64.

A digital comparator 94 determines whether the value of the deviation data $\Delta V$ from the subtracter 92 is positive or negative. The digital comparator 94 outputs an H level signal in the case of $+\Delta V$ and outputs an L level signal in the case of $-\Delta V$.

Reference numerals 96 and 98 denote subtracters of the repetitive type. The subtracter 96 is made operative in response to an H level output from the digital comparator 94. On the other hand, the subtracter 98 is made operative in response to an H level output obtained by inverting an L level output of the digital comparator 94 by an inverter 99. The subtracters 96 and 98, when in the operative mode, subtract the deviation data $\Delta V$ obtained by the subtracter 92 from the set data GAIN from a gain setting device 100. This subtracting operation is repeated until the result of the subtraction becomes equal to or less than zero. The stopping of the subtracting operations of the subtracters 96 and 98 is controlled by digital comparators 102 and 104 and inverters 106 and 108.

Namely, the digital comparators 102 and 104 monitor the results of the subtraction of the subtracters 96 and 98. Since the outputs of the digital comparators 102 and 104 are at an L level until the results of the subtraction becomes equal to or less than zero, these outputs are inverted by the inverters 106 and 108, thereby allowing the subtracting operations to be executed by the subtracters 96 and 98.

When the results of the subtraction become equal to or less than zero, the outputs of the digital comparators 102 and 104 are set to an H level, and by resetting subtractors to inhibit the repetitive operation of the subtraction, the subtracting operations are stopped.

Further, the outputs of the digital comparators 102 and 104 are fed to one-shot multivibrators 110 and 112. The multivibrators 110 and 112 are triggered by the H level outputs of the digital comparators 102 and 104, so that the multivibrator 110 generates one CW pulse and the multivibrator 112 generates one CCW pulse.

The operation cycle of the pulse frequency operational unit shown in FIG. 7 is executed by clocks of about five $\mu$sec. Therefore, a sufficiently high-speed process can be performed as compared with the highest speed of 1000 pps (1 ms) of the pulse motor.

Figure 8:
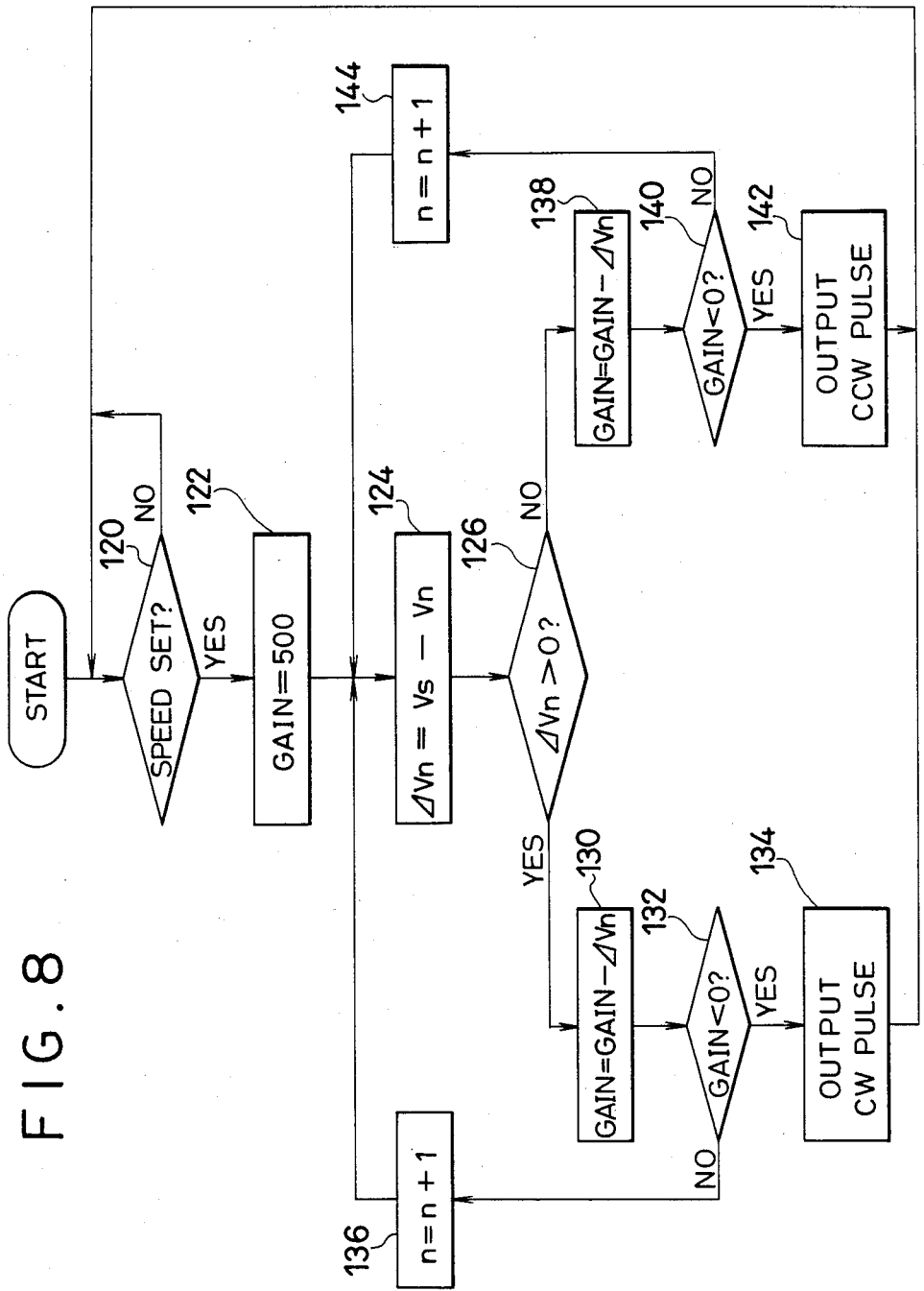
FIG. 8 is a flowchart showing the arithmetic operating processes in FIG. 7.

The control process of the pulse frequency operational unit in FIG. 7 will now be described with reference to a flowchart shown in FIG. 8.

First, a check is made in the discriminating block 120 to see if the speed has been set. If YES, the GAIN is set to a predetermined value in block 122. The GAIN is selected to a sufficiently large value for the deviation $\Delta V$. For example, assuming that the maximum deviation $\Delta V$ which is derived by the feedback control is 50, the GAIN is set to a value which is about ten times as large as 50, namely, e.g., 500. However, eventually, the GAIN is controlled so as to become the minimum value within the range in which the feedback loop can stably operate.

Subsequently, the deviation $\Delta V$ is calculated in block 124. If the deviation $\Delta V$ is a positive value, the process in block 130 is executed.

In block 130, the deviation $\Delta V_n$ at that time is subtracted from the value of GAIN. In the next discriminating block 132, a check is made to see if the result of the subtraction becomes a value below zero.

If NO in block 132, the value n of the counter is increased by one in block 136. Then, the processing routine is returned to block 124 and the deviation $\Delta V_{n+1}$ when the next clock is received is calculated. The result of the subtraction in block 130 is subtracted again from the result of the preceding subtraction. In the next discriminating block 132, a check is made to see if the resultant value is below zero.

If YES in block 132, one CW pulse is output in block 134.

Practically speaking, since the detection speed V is 0 at first, the maximum deviation $\Delta V$ equals 50. In this case, in order to obtain the resultant value below zero, the subtraction cycle is repeated ten times since the GAIN is 500. Namely, when $\Delta V=50$, assuming that it takes, e.g., 100 $\mu$sec for one subtraction cycle, one CW pulse is output at every $10\times100$ $\mu$sec=1 msec, so that the pulse motor is driven at the highest speed.

Next, when it is assumed that the detection speed increased and the deviation $\Delta V_n$ decreased to, e.g., 40, the subtraction cycle is repeated thirteen times to obtain the result of the subtraction below zero. Thus, one CW pulse is output at every $13\times100$ $\mu$sec=1.3 ms. As the deviation decreases, the driving speed of the pulse motor is reduced.

When the deviation $\Delta V_n$ becomes 0, the result of the subtraction will never become a value below zero even if the subtraction cycle is repeated any number of times. Thus, the output of the CW pulse is stopped and the actuator is driven at a constant speed (set speed $V_s$) by the hydraulic pressure which is determined by the rotational position of the pulse motor which is decided by the sum of the CW pulses until now, namely, by the integration value of the CW pulses.

On the contrary, when the deviation $\Delta V_n$ calculated in block 124 is a negative value, the process in block 138 is executed to similarly subtract the deviation $\Delta V_n$ from the GAIN. In the discriminating block 140, the subtraction cycle is repeated until the result of the subtraction becomes a value below zero. When the resultant value becomes below zero, block 142 is executed and, in this case, one CCW pulse is generated.

Even in the foregoing digital arithmetic operation, the speed control similar to the case of the analog arithmetic operation shown in FIG. 3 can be performed. In the digital operation, the number of bits of the signal can be set to eight and further to sixteen, so that the speed control can be accomplished with a fairly high degree of accuracy. In addition, since there is no need to use the A/D converter which was used in the conventional digital control, the arrangement of the apparatus is simplified, and the cost of the apparatus becomes cheap.

In FIG. 4, the detection speed operational unit 64 obtains the speed by counting the number of pulses which are derived from the rotary encoder 62. However, it is also possible to detect the period T of the pulses from the rotary encoder 62 and thereby to detect the speed from the reciprocal thereof (1/T).

The numerical values in the foregoing description show the examples of the positions. The invention is not limited to these numerical values.

Further, in the pulse frequency operational unit of FIG. 7, two systems of pulse generators consisting of the repetitive type subtracters, digital comparators, and one-shot multivibrators are independently provided for the CW pulses and for the CCW pulses. However, a single pulse generator system may be provided, namely, the output of the one-shot multivibrator is input to a multiplexer, and the multiplexer is switched on the basis of whether the deviation data $\Delta V$ is positive or negative, thereby allowing either the CW or CCW pulse to be output.

What is claimed is:

1. An apparatus for controlling a speed of a hydraulic actuator which receives a supply of a hydraulic pressure from a fluid pressure source and is driven, said apparatus comprising:
    a digital valve for adjusting an amount of fluid flowing from said fluid pressure source to said hydraulic actuator by opening or closing a valve in accordance with a rotational amount and a rotational direction of a pulse motor;

a detecting means for generating a pulse sequence of a frequency which is proportional to the driving speed of said hydraulic actuator;

a speed operational means for calculating the driving speed of said hydraulic actuator on the basis of said pulse sequence from said detecting means and for outputting digital speed data;

a digital speed setting means for setting the driving speed of the hydraulic actuator by a digital signal; and a pulse frequency operational means for calculating deviation data on the basis of digital set speed data which is set by said digital speed setting means and digital detection speed data which is detected by said detecting means, and for outputting pulses of a frequency which is proportional to a magnitude of said deviation data as CW pulses or CCW pulses in accordance with whether said deviation data is positive or negative.

2. A speed control apparatus according to claim 1, wherein said speed operational means has pulse number operational means for calculating speed data on the basis of the number of pulses per constant period of time of said pulse sequence derived from said detecting means.

3. A speed control apparatus according to claim 2, wherein said pulse number operational means has:

a counter for counting the number of pulses derived from said detecting means at every predetermined period of time;

a memory means which has a plurality of memory areas for storing count values of said counter and for sequentially storing said count values of said counter in a first-in/first-out manner; and an adding means for reading out all of said count values stored in said plurality of memory areas of said memory means at every counting period of time of said counter and for adding said count values and for outputting the result of the addition.

4. A speed control apparatus according to claim 1, wherein said speed operational means has operational means for calculating speed data from the reciprocal number of the period of time of the pulse sequence derived from said detecting means.

5. A speed control apparatus according to claim 1, wherein said pulse frequency operational means has:

subtracting means for detecting deviation data by performing a subtraction between said digital set speed data and said digital detection speed data;

a repetitive type subtracting means for subtracting said deviation data derived by said subtracting means from predetermined GAIN data and for repeating the subtracting operation until the result of the subtraction becomes a value below zero; and a pulse generating means which, in the case where the result of the subtraction by said repetitive type subtracting means becomes a value below zero, outputs one CW pulse if said deviation data is positive and which outputs one CCW pulse if said deviation data is negative.

* * * * *